United States Patent Office 3,835,010
Patented Sept. 10, 1974

3,835,010
ION-SENSITIVE ELECTRODE BASED ON NEUTRAL CARRIER COMPLEX
Robert J. Levins, Richmond, Va., assignor to Philip Morris Corporation, New York, N.Y.
Continuation-in-part of abandoned application Ser. No. 179,941, Sept. 13, 1971. This application June 21, 1972, Ser. No. 264,769
Int. Cl. G01n 27/46
U.S. Cl. 204—195 L          8 Claims

ABSTRACT OF THE DISCLOSURE

An electrode is provided which is remarkably sensitive to and is selective toward barium ions and strontium ions present in a test solution containing other common cations such as, for example, $Ca^{++}$, $Mg^{++}$, $Na^+$, $H^+$ and $Li^+$. This electrode comprises a region containing an ion-exchange material which is a neutral carrier complex that is extremely selective toward these cations. This electrode is employed in conjunction with a conventional electrode such as a calomel electrode or a silver-silver chloride electrode to measure the activity of said ions in solutions.

RELATED APPLICATIONS

This application is a Continuation-In-Part of Ser. No. 179,941, filed by Robert J. Levins on Sept. 13, 1971, now abandoned, entitled "Ion-Sensitive Electrode Based on Neutral Carrier Complex."

BACKGROUND OF THE INVENTION

The use of ion-sensitive electrodes for the determination of the concentration or activity of ionic species in solutions is well known and several such electrodes have found widespread industrial and laboratory applications. For example, the glass electrode has long been employed for the determination of hydrogen ions and other cations such as sodium and potassium ions. This type of electrode usually functions by ion-exchange at the interface between the glass and the particular solution rather than by the familiar exchange of electrons.

There are other ion-sensitive electrodes which are variously described in patents and literature. For example, U.S. Pat. 3,429,785 issued Feb. 25, 1969 to James W. Ross describes an ion-sensitive electrode for determining the concentration of polyvalent ionic species, e.g., $Ca^{++}$ and $Mg^{++}$, in aqueous solutions. The sensing element of this electrode is a liquid organic phase which is substantially immiscible with the aqueous solution and it contains an organic ion-exchange material capable of exchanging ions with the aqueous solution.

Another ion-sensitive electrode is described in U.S. Pat. 3,467,590 issued Sept. 16, 1969 to E. G. Gibson et al. The electrode assembly described in this patent employs, as the ion-sensitive element, an ion-exchange liquid which provides an ion-sensitive interface with the solution under test. Other similar electrodes are described in U.S. Pat. 3,438,886, issued Apr. 15, 1969; U.S. Pat. 3,445,365, issued May 20, 1969 and U.S. Pat. 3,497,424, issued Feb. 24, 1970, all to James W. Ross.

In all of the aforementioned patents, the reference electrode is either a standard calomel type electrode or it is the usual silver-silver chloride electrode. However, the ion-sensitive electrodes vary with respect to their sensitivity and selectivity toward various ions. The use of different ion-exchange materials, usually an organic liquid, in the ion-sensitive portion of these electrodes permits the selective measurement of specific ionic species.

While electrodes sensitive to several ions, and particularly cations, are known, there is no known electrode whose ion-sensitive region is selective toward barium ions ($Ba^{++}$). The determination of the ionic activity of barium is frequently desirable and affords a convenient analytical tool. The measurement of barium ion also affords a convenient means for the titration of sulfate ions ($SO_4^=$) due to the very low solubility of barium sulfate ($BaSO_4$).

SUMMARY OF THE INVENTION

This invention is concerned with an electrode which is sensitive to and is selective toward barium ions and strontium ions present in solutions containing other cations such as, for example, calcium, magnesium, sodium, hydrogen and lithium ions. The novel electrode described herein comprises an ion-sensitive region made from an ion exchange material which is a neutral carrier complex as will hereinafter be described.

These and other aspects of this invention will be more fully explained in the following detailed description of the invention taken in connection with the accompanying drawings in which like reference characters are employed to designate like parts.

BRIEF DESCRIPTION OF THE DRAWINGS

The ion-sensitive electrodes which are useful for the purpose of this invention may be illustrated with reference to the drawings wherein.

DETAILED DESCRIPTION OF THE INVENTION

Figure 1:
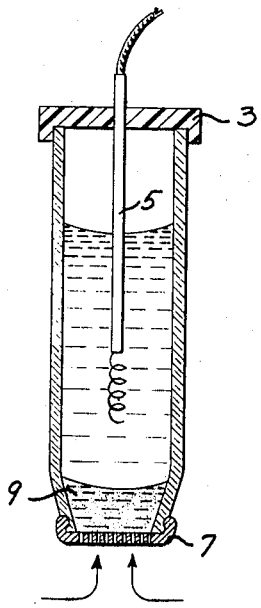
FIG. 1 is an elevational cross-sectional view of a typical electrode embodying the principles of this invention.

Referring now to FIG. 1, there is shown an electrically-insulated container such as a glass tube 1 having two ends; an upper end which is capped by a lid or a cap 3 having a central opening through which extends a reference electrode 5 which may have a coiled terminal portion at one end as shown, and a lower end which is provided with a porous web or member 7 such as a perforated disc or membrane made from an inert material such as glass cloth, cellophane, porous plastic such as polyethylene, polyvinylidene fluoride, and the like. Polyvinylidene fluoride has been found to be a particularly effective and highly efficacious membrane and it is therefore highly preferred for the purpose of this application. The porous member 7 may be integrally attached to the glass tube 1 or it may be provided as a lid or cover securely held in position by any suitable means such as clamps or O-rings (not shown). The internal reference electrode is conventional Ag/AgCl. Disposed interiorly of porous member 7 there is a liquid ion-exchange material 9 which is a neutral carrier complex as will hereinafter be defined in detail. Above the liquid ion-exchange material, the glass tube 1 contains an aqueous solution of 0.1M barium chloride ($BaCl_2$) which is preferably saturated with silver chloride to prevent dissolution of the silver chloride from the Ag/AgCl reference electrode into the $BaCl_2$ solution.

Figure 2:
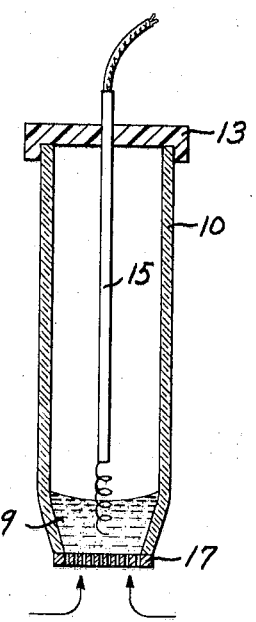
FIG. 2 is an elevational cross-sectional view of another embodiment of an electrode of the type useful herein.

With reference to FIG. 2, it is noted that the electrode shown there is substantially similar to the electrode represented by FIG. 1. The only basic difference in the two electrodes is that in the embodiment depicted in FIG. 2, the terminal coiled end of the reference electrode terminates in the ion-exchange material and that there is no barium chloride solution in the glass container. Thus, referring to FIG. 2, there is shown a glass container 10 whose upper end, as in the electrode shown in FIG. 1, is capped by a lid 13 having a central opening through which extends a reference electrode 15 such as a Ag/AgCl electrode. At its lower end, the glass tube 1 is provided with a porous membrane 17 which may be an integral part of the glass tube and which is made from an inert material such as the porous membrane 7 in FIG. 1, supra. Disposed interiorly of porous member 17, the glass tube 1 contains ion-exchange material 19 which is a neutral carrier complex as will hereinafter be described in detail. As shown in FIG. 2, the coiled end of the reference electrode terminates in the ion-exchange material 19.

In both of the embodiments shown in FIGS. 1 and 2, the ion-exchange material is preferably employed as a relatively thin layer. Although the thickness of this layer is not, per se, critical, it has been found that thinner layers of this ion-exchange material are more responsive to ion-exchange with the test solution and are less affected by the presence of interfering ions. Furthermore, the thinner this layer, the more rapid is the attainment of equilibrium between the ion-exchange material and the test solution.

Although as shown in FIG. 2 there is no barium chloride solution employed in the glass tube, the embodiment represented by FIG. 1 is preferable from the standpoint of its sensitivity and selectivity to ionic measurement. The use of barium chloride solution imposes a fixed charge on the top interface and facilitates the attainment of equilibrium between the barium chloride solution and the test solution.

Figure 3:
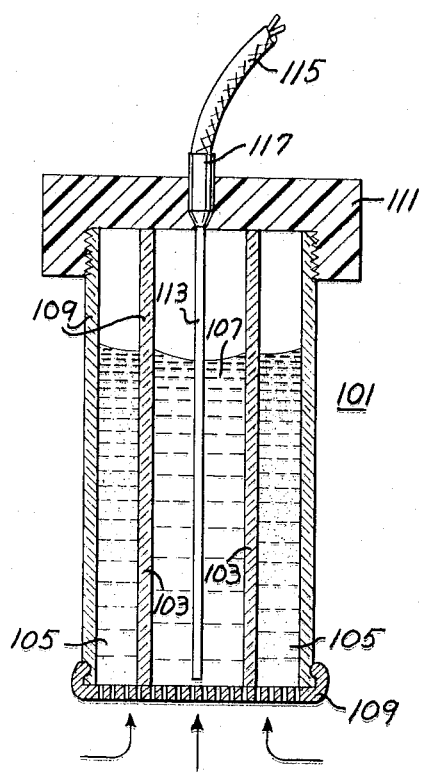
FIG. 3 is an elevational view, partly in section, of an electrode and an electrode assembly incorporating the principles of this invention.

Another embodiment of this invention may be described with reference to FIG. 3 which shows a somewhat simplified version of the electrode assembly described in U.S. Pat. 3,467,590. (Gibson et al.), supra. Referring to FIG. 3, there is shown an elongated annular shell 101 and a tubular member 103 centrally disposed within the said annular shell 101. The walls of the annular shell 101 and the central tubular member 103 define an annular passageway 105 containing the ion-exchange material and passageway 107 defined by the walls of the tubular member 103 containing the reference electrolyte solution. The wall material for both the annular shell 101 and the tubular member 103 is suitably an insulating material such as glass or any other rigid and chemically inert material with respect to the reference electrolyte, the test solution and the ion-exchange material.

The annular shell 101 is provided at one end with a porous member 109, such as a porous film or a porous disc which is either an integral part of the annular shell 101 and the tubular member 103, or it is securely held in position by any suitable known means. At its upper end, the annular shell 101 is provided with a cap 111 threadedly engaged to the walls of this shell which may also be threaded externally to insure tight engagement with the cap 111. Extending centrally and coaxially in passageway 107 is a reference electrode 113 terminating near the porous member 109. At its upper end reference electrode 113 is connected to a lead wire 115 through an electric element such as plug 117 extending through the cap 111 as shown in FIG. 3.

While the reference electrolyte in the aforesaid electrodes is 0.1M aqueous solution of $BaCl_2$ saturated with a solution of silver chloride, where the electrode is used to measure strontium, the reference electrolyte will be a strontium solution of suitable molarity which is saturated with AgCl solution.

As was previously mentioned, the particular form of the electrode or the electrode assembly is not critical, per se, for the purpose of this invention, which resides in the unique and unexpected discovery that certain ion-exhange materials, which are neutral carrier complexes, can be advantageously incorporated in such electrodes for measuring activity of cations such as barium ions and strontium ions in a test solution containing these ions. These neutral carrier complexes show particularly remarkable sensitivity and extraordinary selectivity toward $Ba^{++}$ in the presence of other common cations such as, for example, calcium, magnesium, sodium, hydrogen and lithium. The terms "ion-exchange material" and "neutral carrier complex" will be used interchangeably through this application to denote the same kind of materials.

The ion-exchange material which is uniquely suitable in this invention is insoluble in water and is hence immiscible or at least substantially immiscible with the aqueous solution of the reference electrolyte. This ion-exchange material is an oxonium complex salt conforming to the following general formula:

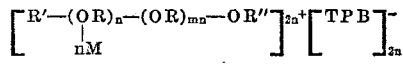

wherein R represents an alkylene radical containing 2 to 4 carbon atoms, but is preferably ethylene or propylene, or a mixture thereof, R' and R'' may be hydrogen, alkyl radical containing 1 to about 20 carbon atoms, preferably 1 to about 12 carbon atoms, an aromatic hydrocarbon radical containing 6 to about 14 carbon atoms, an alkyl aromatic group in which the alkyl substitutent contains 1 to about 20 carbon atoms such as, for example, nonylphenyl and octylphenyl, an ester group such as fatty acid esters, notably sorbitan fatty acid esters, and wherein R' and R'' may be the same or they may be dissimilar, TPB represents tetraphenyl boron or one of its substituted analogs, M represents barium or strontium, $m$ has a value of from about 9 to about 12 and $n$ represents the number of cations complexed with the ion-exchange material. R' and R'' may be varied to enhance the solubility of the neutral carrier complex in the selected solvent.

It must be emphasized, however, that the electrode of this invention is particularly selective and hence uniquely well suited for determination of barium ions. This selectivity, as will hereinafter be described, is several hundred folds the selectivity of this electrode for other cations.

Unlike the ion-exchange materials which are commonly employed in the prior art and which are ionic in character, the ion-exchange materials employed herein are neutral carrier complexes, i.e., they are electrically neutral organic molecules which carry a sequence of localized charges of sufficient energy to form ion-dipole ligands with the particular cations. While not wishing to be bound by any theory or mechanism, it is believed that these neutral carrier complexes form a solvation shell around a cation having an appropriate charge and atomic radius, thus effectively replacing that ion's hydration shell.

The neutral carrier complexes contemplated by the present invention are soluble in various water-immiscible organic solvents such as, for example, nitrobenzene, homologs of nitrobenzene, ortho-dichlorobenzene, para-nitroethylbenzene, aliphatic ketones containing from about 5 to about 12 carbon atoms such as, for example, 3-methylcyclohexanone, phenylacetonitrile and the like. Para-nitroethylbenzene has been found to be a particularly effective solvent for the neutral carrier complexes employed herein. The neutral carrier complex is preferably prepared as a saturated or substantially saturated solution in any of these solvents (containing from about 5 to about 10 weight percent of the neutral carrier complex). When these complexes are dissolved in the solvent, an equilibrium is set up among the neutral carrier complex, the complexed ion and the free cations and anions of the test solution.

There are variety of commercially available non-ionic polymers which contain the polyoxyalkylene group required for complexing with the desired ion. Such polymers include "Carbowax" and "Tergitol" which are Union Carbide's trade names for polyethylene oxides and polyethylene glycol ethers, respectively, "Pluoronic" polymers which is the trade name of the Wyandotte Chemical Corporation for copolymers of ethylene oxide and propylene oxide, "Tween," "Brij" and "Myrj" which are trade names employed by Atlas Chemical Industries for polyoxyethylene sorbitan fatty acid esters, polyoxyethylene fatty ethers and polyoxyethylene stearates, respectively, and "Igepal" which is GAF's trade name designation for alkylphenoxy poly (ethyleneoxy) ethanols. It is preferable that these polymers contain at least about 12 polyoxyalkylene units.

The method of preparation of these neutral carrier complexes is described by Robert J. Levins and Robert M. Ikeda in an article entitled "Direct Potentiometric Titration of Polyethylene Glycols and Their Derivatives With Sodium Tetraphenylboron," Analytical Chemistry, Vol. 37, No. 6, pages 671–675. Briefly, the complex may be prepared by dissolving the polymer (polyethylene glycol) in water and adding an excess solution of barium chloride to the resulting polymer solution. Thereafter, an aqueous solution of sodium tetraphenylboron is added to the resulting mixture thereby precipitating the oxonium ion complex. This precipitate is washed with water, filtered and the polyethylene glycol complex is then vacuum dried at 50° C. for several hours, or alternatively, it is vacuum dried over anhydrous phosphorous pentoxide.

The neutral carrier complexes of the present invention are prepared by the reactions of poly (ethylene oxide) type compound with the metallic ion and TPB. The metallic component of this complex varies depending upon the intended use of the electrode. Thus, when the electrode is to be employed for the determination of activity of barium ions, M, the metallic component of the foregoing general formula will be barium. Similarly, when the electrode is used for determinations of activity for the determination of strontium ions, M will be strontium.

For use in the electrodes described herein, the neutral carrier complex is dissolved in a suitable water-immiscible solvent of the type hereinbefore described until a saturated solution is obtained. Thus, for example, the Igepal CO 880 [nonylphenol poly (ethyleneoxy) ethanol] complex is dissolved in para-nitroethylbenzene until the solution becomes saturated with respect to this complex. This solution is then employed as the ion-exchange material in the electrode.

The use of these neutral carrier complexes for measurement of $Ba^{++}$ will now be illustrated using an electrode assembly such as that described in FIG. 3. Thus, a porous disc (0.45 micron pore size) made from polyvinylidene fluoride was employed as the porous membrane and passageways 105 and 107 were filled, respectively, with a saturated solution of the ion-exchange material in para-nitroethylbenzene and an aqueous 0.1M solution of $BaCl_2$ saturated with AgCl. The ion-exchange material was prepared using Igepal CO 880 and tetraphenylboron to form the barium complex in the manner described in the aforementioned article.

The electrode assembly was then used in a conventional manner using a standard external reference electrode to form an electric circuit, with the porous membrane and the reference electrode being simultaneously immersed in the test solution. The potential difference between the electrode was thus measured using a high input impedance ($>10^{13}$ ohms) voltmeter. The selectivity of this electrode for $Ba^{++}$ was measured using the simplified Eisenman equation or from measurement of the activity ratios of the two ions which produced the same potential difference.

It must be noted that like the ion-sensitive electrodes of Ross and Gibson et al., both supra, the ion-sensitive electrodes of this invention exhibit Nernstian response to the activity of barius ions, strontium ions, and the other cations which were previously mentioned. Thus, when the electrode described herein is used to measure the activity of barium ion, for example, such activity may be measured in accordance with the well-known Nernst equation as follows:

$$E = C + \frac{RT}{nF} \ln a$$

wherein E is the potential measurement of the system in millivolts, C is a constant depending upon the type of reference electrode, the activity of the internal aqueous reference solution and includes a small liquid junction potential, R is the gas constant per mole, T is the absolute temperature, $n$ is the ionic charge, F is the Faraday constant and $a$ is the activity of the barium ion in the test solution. The product $RT/F$ is also known as the Nernst factor.

Figure 4:
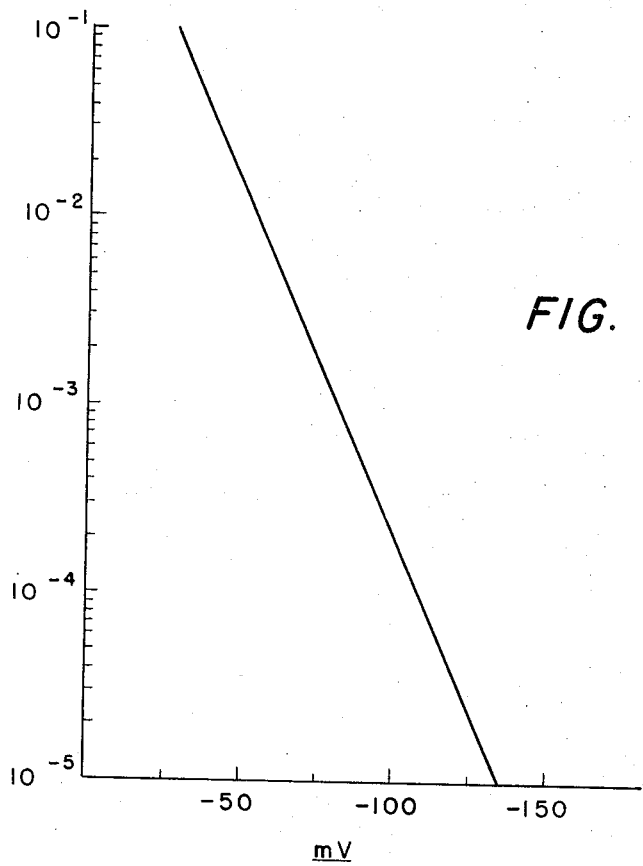
FIG. 4 is a graph showing the response of an electrode embodying the principles of this invention toward barium ions.

When the electrode of this invention is used for measurement of the activity of barium ions in a test solution using a procedure such as that hereinbefore described, the resulting Nernstian relationship between the activity of the barium ions and the resulting potential can be represented by the graph shown in FIG. 4 which indicates a straight line relationship.

Figure 5:
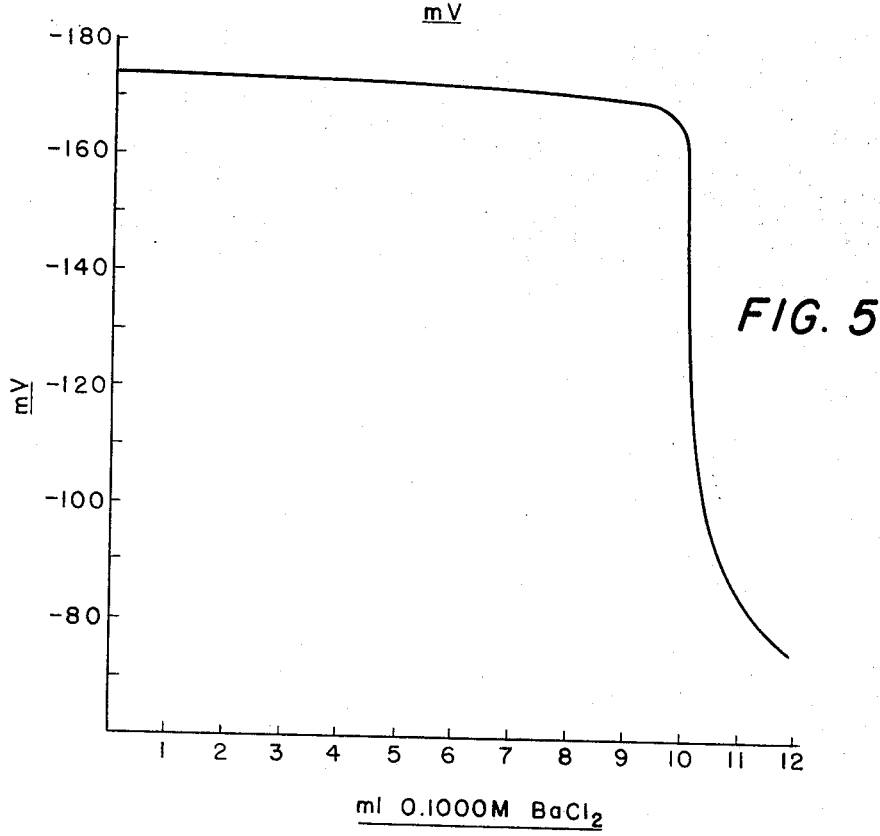
FIG. 5 is a graph showing the results of titration of sulfate ions with barium ions using an electrode embodying the principles of this invention.

As was previously stated, the ion-exchange electrodes of this invention may also be employed for the titration of sulfate ions. The results of a typical such titration is shown in FIG. 5 using 0.1M aqueous solution of sodium sulfate ($Na_2SO_4$) and 0.1M aqueous solution of barium chloride.

When an electrode embodying the principles of this invention was used to measure the activities of various ionic species, the results indicated a remarkable selectivity and sensitivity toward barium ions. These results are shown in the following Table:

TABLE

| Ion | Selectivity Ratio |
| --- | --- |
| $Ba^{2+}$ | 1.0 |
| $Sr^{2+}$ | $2 \times 10^{-3}$ |
| $Ca^{2+}$ | $<1 \times 10^{-4}$ |
| $Mg^{2+}$ | $<1 \times 10^{-4}$ |
| $Ni^{2+}$ | $<1 \times 10^{-4}$ |
| $Co^{2+}$ | $<1 \times 10^{-4}$ |
| $Zn^{2+}$ | $<1 \times 10^{-4}$ |
| $Fe^{2+}$ | $<1 \times 10^{-4}$ |
| $K^+$ | $8 \times 10^{-3}$ |
| $NH_4^+$ | $6 \times 10^{-4}$ |
| $Na^+$ | $2 \times 10^{-4}$ |
| $Li^+$ | $2 \times 10^{-4}$ |
| $H^+$ | $2 \times 10^{-4}$ |

It is noted from this table that the selectivity of the ion-exchange electrodes of this invention for barium is significantly greater than its selectivity toward other ions.

The presence of other ions were found to effect the measurement of ionic activity of barium in accordance with the selectivity ratios shown in the foregoing table. It has further been found that copper ions, when present in large concentration in the test solution tends to poison the electrode. Accordingly, from practical standpoint the presence of high concentrations of copper ions should be avoided.

It should also be mentioned that when the electrode of this invention is used for the determination of ionic activity of strontium, the presence of barium and potassium ions must be avoided since their presence will interfere with the proper functioning of the electrode for measuring the activity of strontium ions.

What is claimed is:

1. An electrode for measuring the activity of barium and strontium ions in an aqueous solution comprising:
   (a) a liquid organic phase containing a neutral carrier complex sensitive to said ions, said organic phase being substantially immiscible with said aqueous solution, said neutral carrier complex being a compound selected from the group of compounds having the general formula:

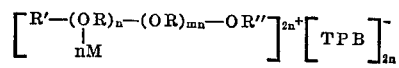

wherein R is an alkylene radical having 2 to 4 carbon atoms, R' and R" is each selected from the group consisting of hydrogen, alkyl radical having 1 to about 20 carbon atoms, an aromatic hydrocarbon radical containing 6 to about 14 carbon atoms, alkyl aromatic radical in which the alkyl substituent contains 1 to about 20 carbon atoms and fatty acid ester radicals, TPB is tetraphenyl boron or a substituted analog of tetraphenyl boron, $m$ has a value of from about 9 to about 12, $n$ is the number of cations complexed in said formula and M is a metal selected from the group consisting of barium and strontium.

(b) a porous member for providing an interface between said organic phase and said aqueous solution, and (c) an internal reference electrode which is in electrical contact with said organic phase.

2. An electrode in claim 1 wherein said R is ethylene of propylene, said R' and said R" each is selected from the group consisting of hydrogen, alkyl radical having 1 to about 12 carbon atoms, nonylphenyl, octylphenyl and sorbitan fatty acid esters.

3. An electrode as in Claim 3 wherein said M is barium.

4. An electrode as in Claim 3 wherein said M is strontium.

5. An electrode as in Claim 2 wherein said porous member is made of polyvinylidene fluoride.

6. An electrode as in claim 1 wherein said M is barium.

7. An electrode as in claim 1 wherein said M is strontium.

8. An electrode as in Claim 1 wherein said porous member is made of polyvinylidene fluoride.

References Cited

UNITED STATES PATENTS

| 3,598,713 | 8/1971 | Baum et al. | 204—195 L |
| 3,632,483 | 1/1972 | Baum | 204—195 L |
| 3,719,575 | 3/1973 | Niedrach et al. | 204—195 P |
| 3,467,590 | 9/1969 | Gibson et al. | 204—195 L |
| 3,483,112 | 12/1969 | Ross | 204—195 L |

OTHER REFERENCES

Lewis: "Anal. Chem.," vol. 37, No. 6, May 1965, pp. 671–675.

TA-HSUNG TUNG, Primary Examiner

U.S. Cl. X.R.

204—1T